March 15, 1932.  O. BARNACK  1,849,445
ADJUSTING DEVICE FOR THE PARTS OF OPTICAL INSTRUMENTS
Filed May 22, 1931
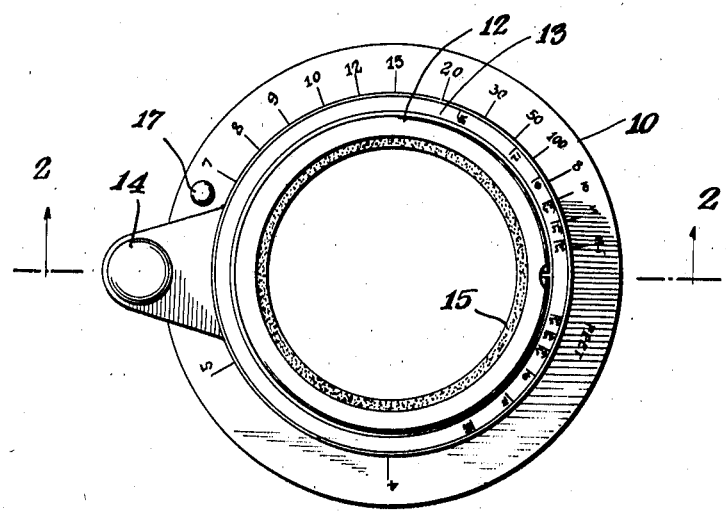
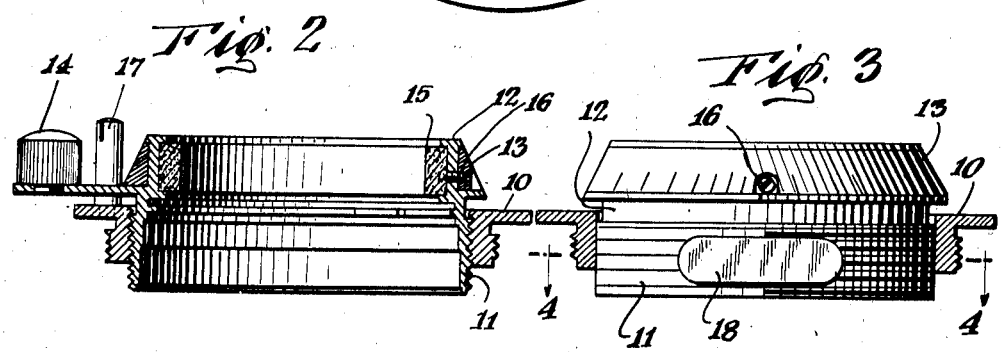
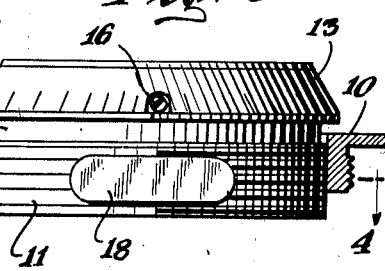
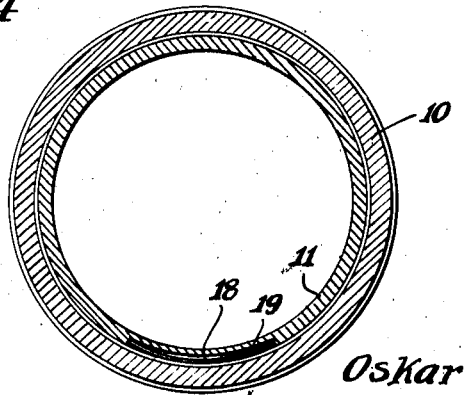
INVENTOR
Oskar Barnack
BY his ATTORNEY Patented Mar. 15, 1932

1,849,445

UNITED STATES PATENT OFFICE

OSKAR BARNACK, OF WETZLAR, GERMANY, ASSIGNOR TO ERNST LEITZ OPTISCHE WERKE, OF WETZLAR, GERMANY

ADJUSTING DEVICE FOR THE PARTS OF OPTICAL INSTRUMENTS

Application filed May 22, 1931. Serial No. 539,339.

This invention relates to improvements in adjusting means for optical instruments, particularly for adjusting the frames or settings of objectives of photographic apparatus, and it is the principal object of my invention to arrange a spring, for instance a leafspring, in the thread by means of which the objective setting is threaded into its socket to avoid frequent lubrication, to produce intimate engagement between these parts, and to produce a uniform suction movement between the parts and to prevent idle motion.

In the known devices of this character the tight-fitting threads had to be frequently coated with a lubricant in order to produce a uniform suction movement within the threads. This coating with a lubricant is easily deteriorating under the influence of changes in temperature and disappears entirely in the threads or is consumed therein.

It is the object of my invention to overcome these disadvantages by the simple interposition of a leaf-spring by the employment of which no lubrication of the parts is required and no necessity to make the engaging threads specially tight. Moreover, all idle motion between the parts is avoided, while a ready movement and suctional effect is produced.

While I prefer the use of a leaf-spring, I may just as well make use of any other suitable spring.

These and other objects and advantages of my invention will become more fully known as the description thereof proceeds, and will then be specifically defined in the appended claims.

In the accompanying drawings forming a material part of this disclosure:

Fig. 1 is a front elevation of an objective constructed according to my invention.

Fig. 2 is a section through the same on line 2—2 of Figure 1.

Fig. 3 is a side elevation of the objective partly in section.

Fig. 4 is a plan view of the same in section on line 4—4 of Figure 3.

As illustrated, the ring 10 carrying the distancing gage has an inner thread adapted to engage the outer thread of the socket 11 of the objective ring 12 having a beveled outer edge 13 provided with a time scale and beneath the bevel edge an operating handle 14.

A felt ring 15 is held within the objective ring 19 by means of a lateral screw 16 and a screw pin 17 unites the objective ring and the distance scale ring.

The socket 11 has formed therein within the thread thereof a depression 18 adapted for the reception of a spring, for instance leaf spring 19 allowing a firm connection between ring 10 and objective ring 12 and its socket 11.

It will be clear that in operation spring 19 will produce a tight connection between ring 12 and ring 10 allowing a uniform suctional rotation of both parts relative to one another, not influenced by changes in temperature and not necessitating lubrication, and permitting a freely fitting of both engaging threads without the necessity of making the engaging threads specially tight fitting, while positively avoiding idle movement.

It will be understood that I have described and shown the preferred form of my device only, as one example of the many ways in which the same may be practically constructed, and that I may make such changes therein as come within the scope of the appended claims without departure from the spirit of my invention and the principles involved, so for instance I may select any other suitable form of spring in order to obtain the desired results.

Having thus described my invention, what I claim as new and desire to secure by Letters Patent is:

1. A device for regulating the relative movement of parts in optical instruments comprising a threaded socket, a ring provided with inner thread to engage the thread of said socket, said socket thread having a depression formed therein, and a spring located in said depression to allow a firm connection of the parts protected against idle motion and of sufficient tightness.

2. A device for producing a tight connection between the threaded ring of objectives for photographic apparatus carrying the distance scale, and an objective frame to make lubrication unnecessary and to avoid idle motion comprising a threaded socket for the objective having a depression formed between the threads thereof, and a leaf-spring inserted and held in said depression to engage the threads of the ring.

3. In combination with a threaded ring, a threaded socket adapted to engage in said ring and having a depression formed in its threaded part, a leaf-spring located and held in said depression to engage the threads of said ring for forming a tight connection without lubrication and the special selection of the engaging threads and avoiding idle motion between the parts.

Signed at Frankfort-on-the-Main, Germany, this first day of May, A. D. 1931.

OSKAR BARNACK.